Patented Oct. 7, 1941

2,258,216

UNITED STATES PATENT OFFICE 2,258,216

PROCESS FOR REMOVAL OF METALLIC IMPURITIES FROM WINES AND OTHER ACID BEVERAGES

William D. Ramage, Berkeley, Calif.

No Drawing. Application November 14, 1938, Serial No. 240,338

7 Claims. (Cl. 99—48)

The removal of iron from acid beverages by means of acid resistant zeolites is disclosed in my Patent No. 2,105,701. Other heavy metals, especially divalent heavy metals, for example copper, are also removed with the iron by the zeolite treatment. Throughout the following specification and claims, I have used the words "metallic impurities" to include all metallic impurities which are removed with the iron, and the words "acid beverages" to include wine and other acid beverages, e. g. fruit juices, which are adapted to treatment in a similar manner.

The zeolite method for iron removal possesses the obvious advantage over ordinary chemical methods that it operates to remove the iron or other heavy metals without the introduction of any soluble anions which would contaminate the product. Excess of the zeolite reagent is entirely inert and is not soluble in the beverage.

I have found, however, that the zeolite action is much faster and the iron removal more complete when the acidity is less than that usually present in wines and fruit juices. This is true even though the zeolite is completely acid resistant. It is also true whether the zeolite is siliceous or carbonaceous in character. When very complete removal of metals is desired, the acidity of the wine or other beverage may be reduced by the addition of an alkali before the zeolite treatment.

In the past, this method has not been considered practical on account of the soluble salts introduced during the neutralization and subsequent reacidification. However, these and other disadvantages are eliminated by the use of the process which I have discovered. In the use of my process, the wine or other beverage is returned to its original condition, except for the absence of the metallic impurities which have been removed.

To effect the partial neutralization of the wine or other beverage, I prefer to use an alkali which leaves no anions in the wine after treatment, e. g. sodium hydroxide. Sodium carbonate may be used when the addition of carbon dioxide to the wine or other beverage is not objectionable. Other alkalis, e. g. alkaline earth hydroxides and carbonates may also be used. The alkaline earth compounds have the disadvantage, however, that they tend to cause removal of certain wine acids by precipitating them as the insoluble alkaline earth salts.

Care must be taken to avoid any appreciable local excess of alkali during the neutralization, especially when a caustic alkali is used as the neutralizing agent. Use of a finely divided reagent and rapid mixing are valuable aids in avoiding a local excess of alkali.

I have found spray dried caustic soda to be a satisfactory reagent, since it dissolves almost instantaneously with good agitation. This is especially true when the finely divided caustic soda is intimately mixed with a finely divided inert material so that agglomeration of the alkali particles is prevented.

I have found that one particularly advantageous way of avoiding local alkali excess during the neutralization is to incorporate the alkali in an inert material in such a manner that no particles of free alkali are present. For example, I have treated finely divided silica or insoluble silicates with a dilute caustic soda solution, in sufficient amount to coat the particles of siliceous material, and dried the resulting mixture under agitation to prevent agglomeration. I have also used a finely ground zeolite as the siliceous carrying material. The dried product was then added to the wine or other beverage, under agitation, in the proper amount to reduce the acidity to the desired point. No local alkali excess can occur when this method is used.

I have found that alpha cellulose is the most convenient inert carrying agent for the neutralizing alkali. The wine may be passed through a pad of alpha cellulose, containing adsorbed caustic alkali or the alkaline alpha cellulose fibers may be dispersed in the wine. The alpha cellulose has the advantage over other inert carrying agents that it effects removal of undesirable colloids from the wine and also removes a large part of the iron. On many wines, use of alkaline alpha cellulose as the neutralizing agent, followed by reacidification as described below, constitutes a complete treatment.

The removal of wine colloids by the alpha cellulose has a further value. If the wine is subsequently passed through a zeolite bed, contamination of the latter is avoided. Since zeolite regeneration is essential to the most economical operation of the process, it is highly desirable to avoid unnecessary contamination of the zeolite during use.

The neutralization may also be accomplished by adding to the wine or other beverage an aqueous solution of alkali, e. g. a dilute solution of sodium hydroxide or potassium hydroxide. The alkali solution must be added slowly and the wine or other beverage vigorously agitated at the point of addition to prevent any local alkali excess.

After neutralization of the wine or other beverage to a suitable pH value, the metallic impurities may be removed by a zeolite treatment, as disclosed in my Patent 2,105,701, or by the addition of chemicals which precipitate the metals in an insoluble form. For example, phosphates which are relatively ineffective in the removal of iron from acid beverages become increasingly effective as the acidity is reduced. The use of a zeolite is, however, the preferred method, since it precludes the possibility of an excess of a soluble chemical reagent. The zeolite or precipitated iron is then removed by filtration, centrifuging, or settling, and the wine is reacidified.

The method of reacidification is one of the most important features of the present invention. If the reacidification is done with ordinary mineral acids, the flavor of the wine is altered by the anions added. Acidification by means of natural organic acids does not return the wine to its original flavor, because the salts formed during neutralization are still present. The cost of the latter method is also high.

The most satisfactory and economical method by which reacidification can be accomplished, without affecting the flavor of the treated beverage, is by means of base exchange materials which are capable of exchanging hydrogen ions for sodium ions. Certain carbonaceous hydrogen zeolites are able to function effectively in this manner. If properly prepared, such zeolites need no special treatment before use in the wine or other beverage. In order to avoid any possibility of affecting the wine or other beverage flavor or color, the zeolite may be given a preliminary digestion in aqueous alcohol to remove the small amount of alcohol soluble materials sometimes present.

The final acidification should be carried out under carefully controlled conditions, so that the acidity of the final product is correct. I have found it convenient and simple to pass the wine through a relatively thin bed of carbonaceous hydrogen zeolite so that more than one pass is necessary to reach the desired acidity. Testing between passes thus gives absolute control of the acidity. The same result may, of course, be secured by a multiple layer zeolite treatment, with suitable provision for sampling and by-passing between layers. The operation of such a system can be entirely automatically controlled.

When the above methods of reacidification are used, the total amount of acidifying agent is not important, since the control is maintained on the liquid itself. The zeolite bed may be used until its acidifying power is exhausted and may then be regenerated by means of a strong acid.

As an alternative method the reacidification may be accomplished by adding to the beverage a predetermined amount of finely divided acid exchange substance, just sufficient so that the desired acidity is reached when the exchange power of the zeolite is exhausted, and then agitating until the reaction is complete. I have found, however, that this method is not as satisfactory as the one described above, because of the variability in the exchange power of a given amount of zeolite and the slowness of the reaction when the exchange power of the zeolite is nearly exhausted.

I have also done the neutralization, iron removal, and reacidification in what amounts to a single step process as follows: The neutralization and iron removal were accomplished by means of a finely divided zeolite, containing excess alkali, and the reacidification then accomplished by adding a carbonaceous hydrogen zeolite without intermediate removal of solids. The entire solid residue was then removed in a single filtration.

I have also used an equivalent alternative to this method as follows: The wine was partially neutralized by passing it through a bed of alpha cellulose containing adsorbed caustic alkali, a large portion of the iron being simultaneously removed by this treatment. Further iron removal and reacidification were then accomplished simultaneously by passing the wine through a bed of carbonaceous hydrogen zeolite. The effluent was crystal clear and required no further treatment.

In general, however, I prefer to remove the iron in a separate step, before reacidification, because of the possibility of redissolving some of the iron when the removal of the metallic impurities and reacidification are effected simultaneously. This becomes especially important when substantially complete removal of iron is required.

When the above procedures are followed and the treating agents are used in a proper manner, the wine or other beverage is returned to its original condition, except for the absence of the metallic impurities which have been removed in the treating process. This removal of impurities prevents subsequent clouding of the beverage and in some cases produces a definite improvement in the flavor.

The following examples of my process are given merely for illustrative purposes:

Finely ground caustic soda was slowly added, under agitation, to 100 gallons of California sauterne wine, having an iron content of 10 parts per million, until the acidity of the wine had been decreased from pH 3.8 to pH 5.7. Two pounds of finely ground sodium zeolite were then added and the wine agitated for two hours with the zeolite present. The wine was clarified by centrifuging and then passed repeatedly through a 4 inch bed of carbonaceous hydrogen zeolite until the acidity was again increased to its original value of pH 3.8. The iron content of the wine after treatment was less than 1 part per million. The untreated wine gave a strong qualitative test for copper and the treated wine showed a bare trace of copper. The flavor of the wine was definitely improved by the treatment. After three months the treated wine was still practically clear, while a check sample of the same wine, untreated, had developed a strong fluorescent cloudiness.

An additional 100 gallons of the same wine was passed through a series of alpha cellulose pads which had been treated with a 1% sodium hydroxide solution and dried. The acidity was decreased to pH 5.8. The wine was then passed through a column of sodium zeolite approximately 6 feet long and 6 inches in diameter. It was then passed repeatedly through a 4 inch bed of carbonaceous hydrogen zeolite until the acidity had again been increased to its original value of pH 3.8. The iron content of the treated wine was less than 0.2 parts per million. No cloudiness developed after three months standing.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects, which may be found useful in many other applications thereof.

I claim:

1. A process for removing soluble metallic impurities from an acid beverage which comprises partially neutralizing the acid beverage, contacting the beverage with a base exchange material whereby the metallic content of the acid beverage is reduced and then contacting the acid beverage with a hydrogen zeolite whereby the acidity of the acid beverage is increased to substantially the original acidity of the acid beverage.

2. A process for removing soluble iron from wine which comprises partially neutralizing the wine, contacting the wine with a zeolite whereby soluble iron is removed from the wine by base exchange and then contacting the wine with a carbonaceous hydrogen zeolite whereby the acidity of the wine is increased to substantially the acidity of the untreated wine.

3. A process for treating acid beverage in which the acidity and the iron content of the acid beverage are reduced by contacting the acid beverage with alpha cellulose containing adsorbed alkali and the acid beverage is subsequently reacidified by contacting it with a carbonaceous hydrogen zeolite.

4. A process for removing soluble metallic impurities from an acid beverage which comprises adding an alkali to partially neutralize the acid beverage and then contacting the acid beverage with a carbonaceous hydrogen zeolite whereby the metallic content of the acid beverage is reduced and the acidity of the acid beverage is increased to substantially the acidity of the untreated acid beverage.

5. A process for removing soluble iron from wine which comprises adding an alkali to partially neutralize the wine and then contacting the wine with a base exchange material whereby the iron content of the wine is reduced and metallic ions are replaced by hydrogen ions so that the acidity of the wine is increased to substantially the acidity of the untreated wine.

6. A process of treating wine which comprises contacting the wine with a zeolite containing excess alkali whereby the acidity and the iron content of the wine are reduced and then contacting the wine with a carbonaceous hydrogen zeolite whereby the acidity of the wine is increased to substantially the original acidity of the wine.

7. A process of treating an acid beverage which comprises contacting the acid beverage with a zeolite containing excess alkali whereby the acidity and the metallic impurities of the acid beverage are reduced and then contacting the beverage with a carbonaceous hydrogen zeolite whereby the acidity of said beverage is increased to substantially the original acidity of the acid beverage.

WILLIAM D. RAMAGE.